United States Patent [19]
Mahoney et al.

[11] Patent Number: 5,773,726
[45] Date of Patent: Jun. 30, 1998

[54] FLOW METER PITOT TUBE WITH TEMPERATURE SENSOR

[75] Inventors: Ralene S. Mahoney, Boulder; Donald R. Verhaagen, Golden; John Everett Garnett, Boulder, all of Colo.

[73] Assignee: Dieterich Technology Holding Corp., Boulder, Colo.

[21] Appl. No.: 658,147

[22] Filed: Jun. 4, 1996

[51] Int. Cl.$^6$ ..................................................... G01F 1/46
[52] U.S. Cl. ........................................................ 73/861.65
[58] Field of Search ............................ 73/861.66, 861.65

[56] References Cited

U.S. PATENT DOCUMENTS

| | | | |
|---|---|---|---|
| 4,466,290 | 8/1984 | Frick . | |
| 4,559,836 | 12/1985 | Bond et al. . | |
| 4,696,194 | 9/1987 | Taylor | 73/861.66 |
| 5,036,711 | 8/1991 | Good | 73/861.66 |
| 5,161,410 | 11/1992 | Davey et al. | 73/204.22 |
| 5,402,112 | 3/1995 | Thompson | 340/622 |

OTHER PUBLICATIONS

IEEE Transactions on Nuclear Science, vol. NS–32, No. 1, Feb. 1985, New York, U.S.A. Title: "One—And Two–Dimensional Position Sensitive Scintillation Detectors for Thermal Neutrons" by I. Kurz et al. pp. 453–456.

Primary Examiner—Richard Chilcot
Assistant Examiner—Jewel Artis
Attorney, Agent, or Firm—Richard W. Hanes

[57] ABSTRACT

A fluid pressure and temperature sensing probe assembly for a mass flow measurement system comprising, a tubular body, a portion of which is adapted for insertion into the fluid flowing in a confined conduit, and having, within the body, a pair of separated plenums. Openings are provided in the tubular body which expose the respective plenums to high and low fluid pressures in the fluid flow. An electrically responsive temperature sensor, having an electrical signal output, is disposed within the tubular body of the probe. A pressure transducer, in fluid communication with the plenums, converts the fluid pressures in the plenums to at least one electrical signal representative of the difference between the high and low fluid pressures. A transmitter transmits the electrical signal from the pressure transducer and the electrical temperature signal to a remote location.

9 Claims, 3 Drawing Sheets

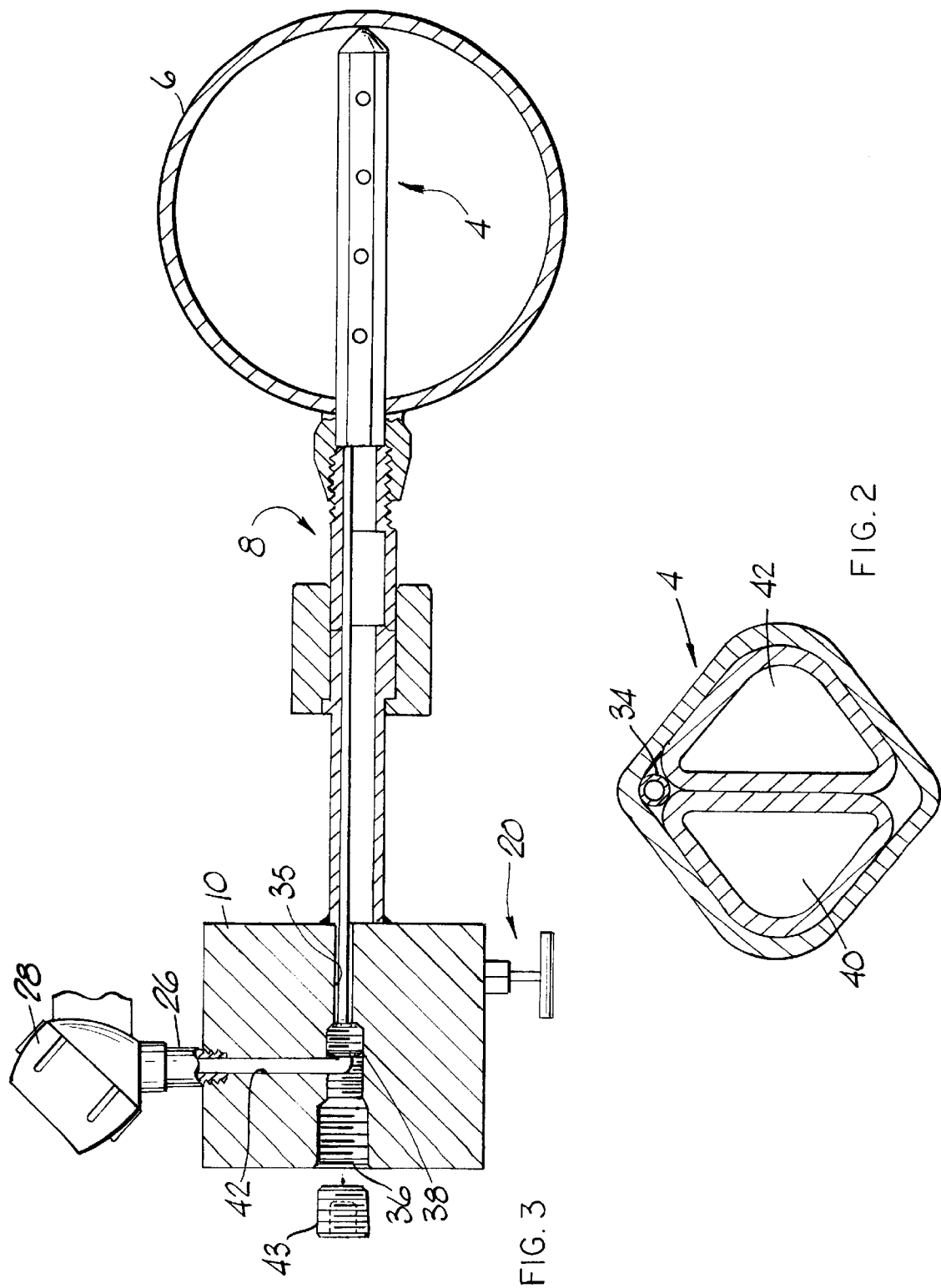

FLOW METER PITOT TUBE WITH TEMPERATURE SENSOR

The present invention relates to pitot tube type flow meters for use in confined conduits, such as pipes, and more particularly to a combined apparatus for sensing the relevant pressures and the temperature of the flowing fluid and conveying signals representative thereof to a transmitter which develops and transmits electrical signals representative of the fluid flow variables, such as rate, volume and mass.

BACKGROUND

Pitot tube flow sensors of the type disclosed in U.S. Pat. No. 4,559,836 to Darrel F. Coleman et al. have been in use for many years in differential pressure flow measurement systems to detect the average impact, or high pressure, on the upstream facing side of the pitot tube and to detect low fluid pressure on the downstream facing side of the tube. Traditionally, the high and low fluid pressures have been used to derive an electrical signal representative of fluid flow rate.

The fluid pressures sensed and conveyed by the pitot tube or other kind of differential pressure sensor, such as an orifice plate, for example, are conveyed to a pressure transducer through an interconnecting head, such as the one shown by reference numeral 24 in the said '836 U.S. Patent, or by a valve manifold, such as the one shown by reference numeral 17 in U.S. Pat. No. 4,466,290 to Roger L. Frick.

When it is desired to sense the temperature of the medium flowing in the pipe, temperature sensing devices such as a Thermowell RTD (Resistive Temperature Device) have been used, inserting the RTD into a protective sheath, such as a "Thermowell", which is immersed in the fluid whose temperature is being sensed.

In the continued development of sophisticated flow measurement systems for processing fluids it has become increasingly important to be able to measure volume and mass of fluid, as well as rate. In order to do that, however, temperature of the fluid must be known. Because intrusive measurement of the various parameters of a fluid flowing in a pipe requires penetration of the pipe, it is also important to sense the required parameters with a single instrument, requiring only one intrusion into the pipe.

It is therefore, the primary object of the present invention to provide a single apparatus for sensing temperature in a fluid flowing in a confined channel, as well as sensing the high and low pressures which have been previously detected by a pitot tube type of flow sensor.

A second object of the invention is to provide a combination temperature and pressure sensing device for fluid flowing in a pipe that will allow the temperature sensing portion of the assembly to be removed and replaced without having to also remove the primary pressure sensor from the pipe.

Another object of the present invention is to advantageously use the available space inside of a prior art pitot tube to house a temperature sensing device.

Other and further objects, features and advantages of the invention will become apparent upon a reading of the detailed description of a preferred form of the present invention.

DESCRIPTION OF THE DRAWINGS

FIG. 2 is an enlarged cross sectional view taken along line 2—2 of FIG. 1.

FIG. 3 is a cross sectional view of the primary flow sensor of the present invention, including the pipe into which the combined pressure and temperature sensor elements are inserted and the manifold head mounted on the proximal end of the sensor.

DETAILED DESCRIPTION OF THE INVENTION

Figure 1:
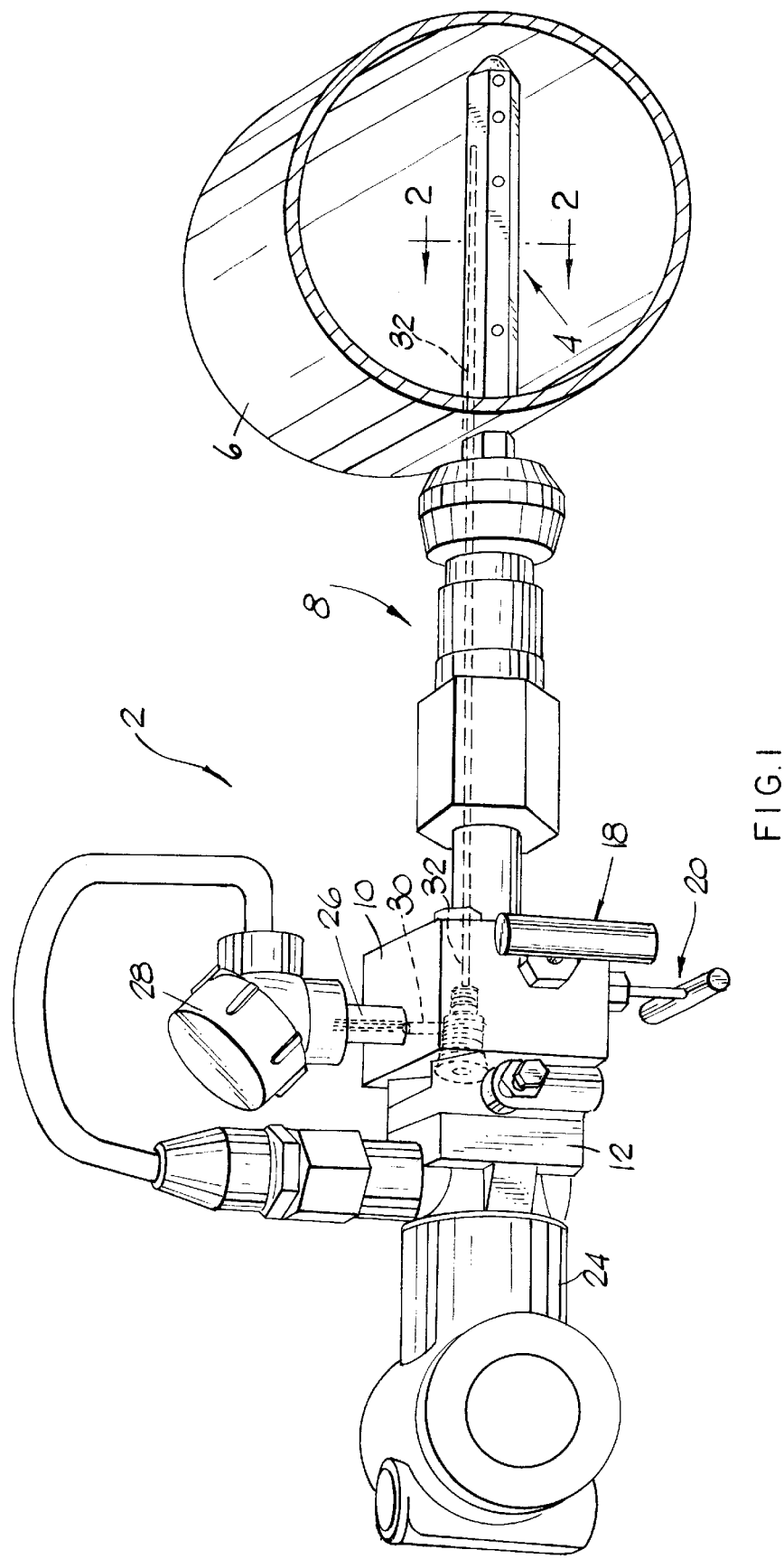
FIG. 1 is perspective view of a fluid flow measurement system in which the elements of the present invention function.
Figure 4:
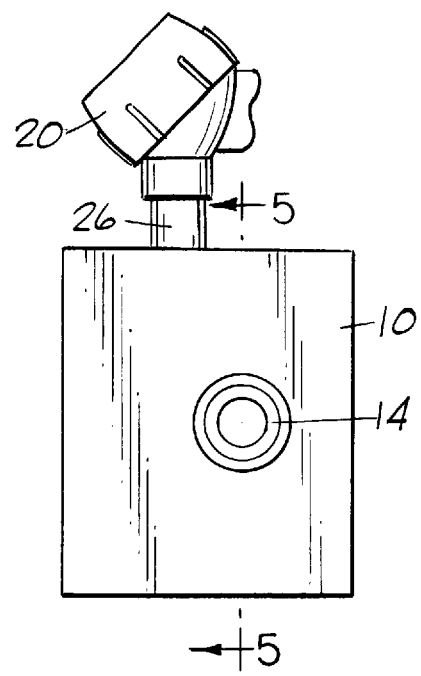
FIG. 4 is an end view of the manifold of the present invention showing the riser and the terminal housing on one side of the manifold and the receptacle for one of the pressure valves on the end shown. The opposite end is a mirror image of the end shown.
Figure 5:
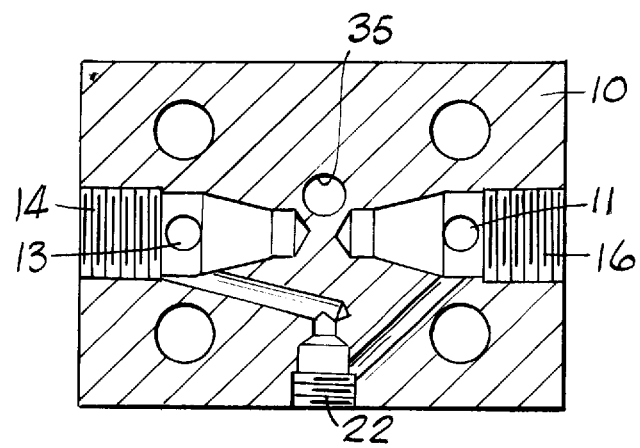
FIG. 5 is a cross sectional view taken along lines 5—5 of FIG. 4.
Figure 6:
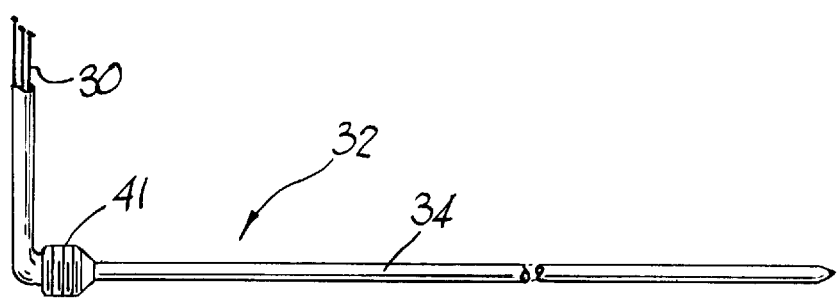
FIG. 6 is a side view of the preferred form of temperature sensor.

FIG. 1 illustrates a typical flow measurement system 2 to which the combination of the present invention is applied. The primary portion of the system comprises a pitot tube type of differential pressure flow sensor 4 (of the type described in the above referred to U.S. Pat. No. 4,559,836), which is inserted diametrically into a pipe 6 carrying fluid. The mounting hardware, which forms no part of the present invention, is shown generally by reference numeral 8. The proximal end of the pitot tube terminates in a manifold head 10 where the high and low pressure fluids are conveyed though interior channels of the manifold to a pressure transducer 12 mounted directly to the manifold 10. As shown in FIG. 5, the interior fluid conducting conduits 11 and 13 in the manifold pass respectively through a pair of shut off valves which are disposed in threaded receptacles 14 and 16 of the manifold. One valve 18, of the two, is shown in FIG. 1. A third, equalizing valve 20, positioned in receptacle 22 in the manifold, is opened to interconnect the high and low pressure conduits 11 and 13 to equalize the fluid pressure in the manifold for the purpose of calibrating the transmitter. While a three valve manifold is shown, a five valve to manifold can be employed with the present invention.

Attached to the pressure transducer 12 is the so-called differential pressure transmitter 24, but which, in the context of this invention, processes and transmits signals representative of the mass and volume of the fluid flowing in the pipe 6, as well as differential pressure and fluid flow rate.

Attached to one face of the manifold 10 is a riser 26 which supports a housing 28, containing an electrical terminal (not shown). The terminal inside the housing 28 interconnects the wiring 30 from a temperature sensing device with other wiring (not shown) which conducts the temperature signal into the differential pressure transmitter 24 for use in determining the mass and/or volume of the fluid in the pipe 6.

The temperature sensing device 32 is preferably a resistive temperature device such as the ARI and Weed RTD manufactured by Texas Thermowell, Inc. Such a device comprises an elongated rigid resistive element 34 having conductors 30 which convey the signal from the resistive element to a further signal processing site. Referring now to FIGS. 1 and 2, the RTD temperature sensor is seen in its installed position within a space in the pitot tube 4 between the high and low pressure plenums 40 and 42.

As seen in FIG. 3, the manifold 10, in addition to the valves and conduits already mentioned, contains a bore 35 which traverses through the body of the manifold. The bore 35 is sized and positioned in the manifold to act as a conduit through which the rigid resistive element 34 of the RTD temperature sensor 32 is passed during its insertion into, or retraction from, the pitot tube 4. When the rigid to portion 34 of the temperature sensor is fully inserted into the pitot tube, the temperature sensor conductors 30 are then trained through a transverse duct 42 in the manifold 10, which duct is in communication with the riser 26. The conductors are run through the riser to be connected to the terminal in the housing 28.

One end of the bore 35 is provided with two radially enlarged and threaded receptacles 36 and 38, of different diameters. After the temperature sensor 32 is in position in the pitot tube and the manifold, a threaded collar 41 on the proximal end of the elongated resistive portion 34 of the temperature sensor is threaded into the small receptacle 38 for the purpose of mounting and securing the temperature sensor. After the temperature sensor is thus secured, a threaded sealing plug 43 is screwed into the larger outer receptacle 36 after which the pressure transducer 12 can be attached to the manifold, as it is shown to be in FIG. 1.

We claim:

1. A sensing probe assembly for a flow measurement system comprising,
   a tubular body, a portion of which is adapted for insertion into the fluid flowing in a confined conduit, and having within said body separated plenums, means exposing the respective plenums to the high and low fluid pressures in the flow, respectively;
   manifold means attached to that portion of the tubular body which is disposed outside of the fluid flow, and having,
   valved passages for conveying the said high and low fluid pressures through the manifold,
   terminal means carried by said manifold for interconnecting electrical components,
   a duct for carrying electrical conductors, and
   electrically responsive temperature sensing means disposed within the tubular body and having connecting means which are directed through the manifold's duct for connection with the terminal means.

2. The combination of claim 1 wherein the manifold means further includes a bore traversing the manifold and aligned with the interior of the tubular body through which bore the temperature sensing means may be passed in the process of inserting or removing the temperature sensing means from the tubular body.

3. The combination of claim 2 wherein the duct for carrying electrical conductors is in communication with the bore.

4. The combination of claim 3, wherein the temperature sensing means is of the resistive type and comprises a rigid elongated sensing probe disposed within the tubular body between the high and low pressure plenums.

5. The combination of claim 4 wherein the rigid elongated sensing probe is mounted for support in the bore of the manifold means.

6. The combination of claim 5 wherein the said plurality of electrical conductors are disposed in the duct and are connected to the terminal means.

7. A pressure and temperature sensing probe assembly for a mass flow measurement system comprising,
   a tubular body, a portion of which is adapted for insertion into the fluid flowing in a confined conduit, and having, within said body, a pair of separated plenums,
   openings in said tubular body which expose the respective plenums to high and low fluid pressures in the fluid flow,
   electrically responsive temperature sensing means having an output and disposed within the tubular body,
   pressure transducer means in fluid communication with the said plenums for converting the fluid pressures therein to at least one electrical signal representative of the difference between the said high and low pressures,
   a transmitter responsive to the electrical signal from the pressure transducer and to the output of the temperature sensing means.

8. The combination of claim 7 and further including,
   mounting means attached to the tubular body and including a traversing bore aligned with the interior of the tubular body through which bore the temperature sensing means may be passed in the process of inserting or removing the temperature sensing means from the tubular body.

9. The combination of claim 8 wherein the temperature sensing means is of the resistive type and comprises a rigid elongated sensing probe disposed within the tubular body between the high and low pressure plenums.

* * * * *